United States Patent
Theuerkorn

(10) Patent No.: US 10,414,120 B2
(45) Date of Patent: Sep. 17, 2019

(54) LOAD-BEARING AND HEAT-INSULATING STRUCTURAL ELEMENT MADE OF TYPHA LEAF MASS

(71) Applicant: Fraunhofer-Gesellschaft zur Förderung der angewandten Forschung e.V., Munich (DE)

(72) Inventor: Werner Theuerkorn, Postmünster (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 0 days.

(21) Appl. No.: 14/436,406

(22) PCT Filed: Oct. 18, 2013

(86) PCT No.: PCT/EP2013/003148
§ 371 (c)(1),
(2) Date: Apr. 16, 2015

(87) PCT Pub. No.: WO2014/060114
PCT Pub. Date: Apr. 24, 2014

(65) Prior Publication Data
US 2015/0283787 A1  Oct. 8, 2015

(30) Foreign Application Priority Data
Oct. 18, 2012  (DE) .......................... 10 2012 219 060

(51) Int. Cl.
*B32B 5/16* (2006.01)
*E04B 1/78* (2006.01)
(Continued)

(52) U.S. Cl.
CPC .................. *B32B 5/16* (2013.01); *E04B 1/78* (2013.01); *E04C 2/16* (2013.01); *E04C 2/296* (2013.01);
(Continued)

(58) Field of Classification Search
CPC ....... B32B 5/30; B32B 2264/065; B27N 3/06; E04B 1/74; E04B 1/745; E04C 2/16
(Continued)

(56) References Cited

U.S. PATENT DOCUMENTS

2006/0062959 A1\* 3/2006 Gerardo Elpidio ....... E04C 2/16
428/105

FOREIGN PATENT DOCUMENTS

DE   196 10 247 A1   2/1997
DE   197 57 418 A1   6/1999
(Continued)

OTHER PUBLICATIONS

Machine translation of DE 19757418 A1 retrieved Sep. 6, 2015.\*
(Continued)

*Primary Examiner* — Alexander S Thomas
(74) *Attorney, Agent, or Firm* — Brinks Gilson & Lione

(57) ABSTRACT

A load-bearing and heat-insulating structural element having a thickness and a planar extension composed of longitudinally cut Typha leaves, which yield rod-shaped Typha leaf particles, wherein the rod-shaped Typha leaf particles are oriented perpendicularly to the thickness of the structural element and are joined among each other by way of bonding, preferably a mineral bonding having no significant non-mineral additives.

11 Claims, 1 Drawing Sheet

(51) Int. Cl.
*E04C 2/16* (2006.01)
*E04C 2/296* (2006.01)
*E04B 1/74* (2006.01)

(52) U.S. Cl.
CPC ... *B32B 2264/062* (2013.01); *B32B 2307/304* (2013.01); *B32B 2419/00* (2013.01); *E04B 2001/745* (2013.01); *Y02A 30/245* (2018.01); *Y10T 428/253* (2015.01)

(58) Field of Classification Search
USPC .................................................. 428/105
See application file for complete search history.

(56) References Cited

FOREIGN PATENT DOCUMENTS

WO     WO 2012/107055 A1    8/2012
WO     WO 2012107053 A1 *   8/2012  ............... E04C 2/16

OTHER PUBLICATIONS

Machine translation of WO 2012107053 retrieved Sep. 15, 2017.*
International Search Report, dated Jan. 16, 2014, pp. 1-2, International Application No. PCT/EP2013/003148, European Patent Office, Rijswijk, The Netherlands.

* cited by examiner

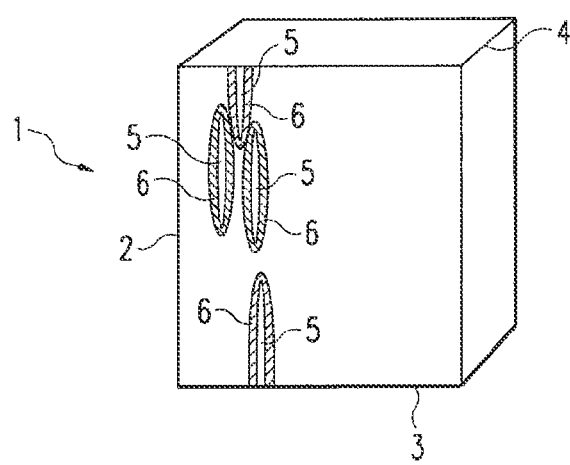

LOAD-BEARING AND HEAT-INSULATING STRUCTURAL ELEMENT MADE OF TYPHA LEAF MASS

CROSS REFERENCE TO RELATED APPLICATIONS

This application is a US national stage entry of PCT/EP2013/003148, filed Oct. 18, 2013, entitled "LOAD-BEARING AND HEAT-INSULATING STRUCTURAL ELEMENT MADE OF TYPHA LEAF MASS," the entire contents of which is hereby incorporated by reference, and which claims priority to German application 10 2012 219 060.0, filed Oct. 18, 2012, entitled "TRAGFÄHIGES UND WÄRME DÄMMENDES BAUELEMENT AUS DER BLATTMASSE VON TYPHA," the entire contents of which is hereby incorporated by reference.

TECHNICAL FIELD

The application relates to a load-bearing and heat-insulating structural element made of Typha leaf mass.

BACKGROUND

An insulating, filling or packing material is known from DE 197 57 418 B4. It contains leaf mass made of Typha, the aerenchyma of which is largely preserved. The leaves are cut in the longitudinal direction. It is indicated that leaf segments having a maximum length of 15 cm, preferably 2 to 6 cm, are used. The particles are compressed under high pressure of more than 1 bar after adding an adhesive.

In one embodiment of DE 197 57 418 B4, the lower thirds of the bulrush leaf mass, glued with Sorel cement adhesive, are inserted parallel as leaf bundles with a length of 60 cm in a U-shaped frame. This generates a packet that is 2 m wide, 1.20 m high and 60 cm deep. Then the leaves are compressed and bonded in the process. The compression is so moderate that essentially only the interstices between the leaves disappear, while the aerenchyma volume is not significantly reduced. Then the packet is cured. Thereafter, panels having a thickness of approximately 7 cm are cut out perpendicularly to the leaf axes. Thus panels are obtained in which the leaves extend along the thickness of the panels. These panels serve as the core layer for sandwich elements, which must comprise cover layers. The cover layers are obtained from the upper third of Typha leaf plants. For this purpose, longitudinal strips approximately 2.5 mm wide are cut, from which pieces approximately 10 cm long are then cut. The mixture of leaf strips is discharged by a spiked roller as a nonwoven fabric about 4 cm high, pre-dried with hot air and then pressed into plates having a thickness of about 3 mm.

From EP 2 295 659 A2, a heat-insulating element based on Typha leaf mass is known. The particles are drastically comminuted in mills, so that particles measuring from tenths of millimeters to several millimeters are generated. In this way, the leaf structure is destroyed before the material is mixed with binding agents and pressed into bodies. The described heat-insulating elements have good insulating properties and are dimensionally stable, but have no significant load-bearing capacity.

BRIEF DESCRIPTION OF THE DRAWINGS

FIG. 1 illustrates a schematic illustration of a structural element designed as a flat panel.

DETAILED DESCRIPTION

Within the scope of the present application, the object is to attain a markedly improved combination of thermal insulation and load-bearing capacity, two goals that frequently conflict with each other. Additional details can be found in the specification and the drawings.

The above-mentioned conflict between thermal insulation and load-bearing capacity is addressed by using the very special leaf structure of Typha in a particular way. For this purpose, a structural element having a thickness and a planar extension is proposed. In many cases, it is a flat panel. However, this is not absolutely necessary.

Initially, however, the invention shall be explained based on a flat panel for reasons of an understandable description. The Typha leaves are cut longitudinally and shortened to suitable lengths. In general, this involves the part of Typha leaves above ground. Longitudinal cutting and shortening to a suitable length yields rod-shaped Typha leaf particles, in which the length is several times the thickness of the same. The panel is composed of these rod-shaped Typha leaf particles. However, this does not preclude other components and particles from being present. The rod-shaped Typha leaf particles are disposed in the panel plane in the structural element according to the invention. This planar orientation allows the rod-shaped Typha leaf particles to be bonded more easily to each other. In the prior art, Typha leaf particles are often processed randomly. While many Typha leaf particles are certainly located in one plane with this procedure, considerable quantities of Typha leaf particles are located at an angle to the panel plane in the prior art. This makes it difficult to bond the Typha leaf particles. However, one essential aspect of the invention is that bonding is simplified, so that, apart from isolated outliers, only rod-shaped Typha leaf particles in a plane can be tolerated. Additionally, it is pointed out that it can be possible that not all rod-shaped Typha leaf particles are bonded among each other, such as when errors occur in the manufacturing process. Due to the simplified bonding, a comparatively weak adhesive can be used. A mineral adhesive is preferred for this purpose. When using a mineral adhesive, which contains no significant non-mineral additives, the structural element can be composted after it is used. This is ecologically advantageous and results in low disposal complexity that is also of interest economically. Additionally, fire prevention concerns can be taken into account. If a magnesite adhesive is used, for example, a hardly combustible structural element is provided for use in the construction field.

The high load-bearing capacity of the structural element is due to the fact that the rod-shaped Typha leaf particles have high rigidity in the longitudinal direction, but can be elastically deformed in the transverse direction with low pressures. Due to orientation in one plane, the free air spaces between the rod-shaped Typha leaf particles are also substantially avoided. This improves the thermal insulation of the structural element. In addition, thermal conductivity is lower transversely to the longitudinal direction of the rod-shaped Typha leaf particles. However, it is precisely in this direction that thermal insulation is required. The key in a panel-shaped thermal insulation element is generally to reduce heat conduction from one side of the panel to the other side of the panel. Heat conduction in the panel plane is generally of lesser importance.

To the extent that mention is made in the prior art of a parallel arrangement of the leaf particles, as in the above-mentioned embodiment of DE 197 57 418 B4, the leaf particles generally run in the direction of the thickness of the panel plane. The above-described advantages are thus not achieved as they are with an orientation perpendicular to the thickness of the panel.

However, in particular structures having a parallel orientation of the leaf particles are not designed as independent structural elements, but rather they must be provided with cover layers.

Only the present invention makes structural elements possible in which no cover layers are required for stabilization.

Based on the flat panels described above, it is easy to understand that these do not necessarily have to be panels. For example, curved panels can likewise be used for round sections of a wall. This illustration of the curved panels is only to intended to clarify that, in place of the flat panels described above, it is also possible to use structural elements that are straight only in one direction, and curved in the other direction. This applies in particular when a substantial share of the rod-shaped Typha leaf particles is oriented in the straight direction. A certain deviation from the straight direction can of course be tolerated.

However, it is also possible for a curvature to be present in both directions of the planar extension. One application for such structural elements would be the construction of a cupola, for example. Here, structural elements are needed that are curved in two directions of the planar extension. Naturally, the curvature must not exceed a certain degree in the direction in which the rod-shaped Typha leaf particles run, since otherwise the benefit of the high level of stability of the rod-shaped Typha leaf particles in the longitudinal direction is lost.

In all the described embodiments—flat panel, which is to say straight in all directions of the planar extension, straight only in one direction, such as a portion of a cylinder, or curved in both directions, such as with a portion of a cupola—the rod-shaped Typha leaf particles are oriented perpendicularly to the thickness of the structural element. Strictly speaking, they are oriented perpendicularly to the section along which the thickness is measured in each case. This is always along the shortest path from one side of the planar extension to the other side. This is to be expressed here concisely by "perpendicularly to the thickness." It goes without saying that 'perpendicularly to the thickness' shall not only be understood to mean exactly a right angle. What is important is to maintain the angle so that the effects and advantages described above are attained.

The structural element may also be a brick-shaped element, which likewise is composed of rod-shaped Typha leaf particles, which are oriented at least in one plane. As is easily evident, the brick-shaped elements are strictly speaking nothing other than panel-shaped elements that are slightly thicker and, in the planar extension, smaller. In the case of bricks, care must be taken to ensure that the Typha leaf particles are oriented so that, for bricks that are built into a wall, the load runs in the direction of the Typha leaf particles. In this respect, the thickness of bricks shall be understood to mean an extension that runs horizontally for an installed brick. This may deviate from the definition of thickness given above. Thus the Typha leaf particles can run vertically and accordingly absorb the loads.

The invention thus provides thermal insulation panels, which can also be used to produce structural elements that assume a decisive degree of load-bearing capacity. Naturally, these structural elements can also be used in structures that already bear loads, such as interior insulation.

In one preferred embodiment of the invention, the rod-shaped Typha leaf particles are oriented in parallel. With a parallel orientation, bonding can be achieved particularly well since the rod-shaped Typha leaf particles disposed in an orderly fashion next to each other already have a large contact surface at comparatively low pressure. Thus there is also little air in the area between the rod-shaped Typha leaf particles. This results in low thermal conductivity transversely to the rod-shaped Typha leaf particles. In the longitudinal direction, the many rod-shaped Typha leaf particles located next to each other result in high load-bearing capacity. For good thermal insulation with high load-bearing capacity in the longitudinal direction, this embodiment can be used to create a very suitable structural element that is able to absorb very high loads, at a low weight and a low need for Typha leaf mass and adhesive.

In one embodiment, the rod-shaped Typha leaf particles are pressed against each other using a pressure in the direction of the thickness, which is to say perpendicularly to the rod-shaped Typha leaf particles, wherein the pressure is selected so as to ensure bonding of the rod-shaped Typha leaf particles across as much of the surface as possible, and undesirable free air spaces between the rod-shaped Typha leaf particles are avoided, and at the same time the sponge tissue and/or supporting tissue of the rod-shaped Typha leaf particles are substantially preserved. This selection of the pressure results in good bonding and thus high stability. Additionally, air pockets are thus avoided, which worsen thermal insulation. However, it is also important not to select the pressure too high, because substantial damage to the sponge tissue and/or the supporting tissue would worsen the thermal insulation and/or the load-bearing capacity. This pressure is dependent on the particular structural element. If, for example, the rod-shaped Typha leaf particles are disposed parallel, a lower pressure should be selected than in the case of an isotropic orientation perpendicular to the thickness. This pressure is also dependent on the desired properties of the structural element. Thus, the load-bearing capacity can be increased via a higher pressure, for example.

A pressure range of approximately 0.1 bar to approximately 1 bar has proven to be a good pressure within the meaning of the above embodiments.

In general, a Sorel bond or a cement bond is used for bonding. A range from 0.5 to 1.5 has proven to be a suitable weight ratio of adhesive to rod-shaped Typha leaf particles. When using mineral adhesives, especially if no substantial non-mineral additives are present, this is a pleasantly low ratio and is made possible by the described orientation. As was already mentioned, a magnesite adhesive is particularly suitable.

In one embodiment, the length of the rod-shaped Typha leaf particles is selected as a function of the desired shape of the structural element and/or the orientation of the rod-shaped Typha leaf particles and/or the planned use of the structural element. For example, regarding the shape of the structural element, it can be stated that the more strongly the structural element is curved in the direction of the rod-shaped leaf particles, the shorter the leaf particles should be. If the rod-shaped Typha leaf particles are disposed substantially parallel to each other, they can be longer, since better bonding is possible. It goes without saying that this applies even more so, the more parallel the orientation is. Therefore, this could also be referred to as a dependence on the degree of alignment. There is also a dependence on the planned usage. For example, higher pressure and tensile strength is achieved with longer rod-shaped Typha leaf particles. As a result, when this kind of higher strength is desired, longer rod-shaped Typha leaf particles should be selected.

The possible length range extends from 5 cm up to the maximum possible length of the Typha leaf. It should be stated here that the rod-shaped Typha leaf particles can originally be longer than the structural element. This is the case when initially long rod-shaped Typha leaf particles are present and then are shortened when cutting the structural element to length. In one direction, the structural elements may be of a single-story height. This allows rapid installation. Naturally, transport is simplified if the structural elements are smaller; about a lateral length of approximately 50 cm to 100 cm is particularly suitable for the sale in building supply stores.

In one embodiment, a cover layer is applied to at least one side of the structural element. The structural element may under certain circumstances be compressible transversely to the direction of the rod-shaped Typha leaves, which is to say in the direction of the thickness, since the rod-shaped Typha leaves can absorb less force in this direction. This results in the described good bonding ability. If improved protection of the structural elements should be desired, a cover layer can be applied to at least one side. Often it is useful to apply cover layers to both sides. Visual requirements can sometimes better be met with a cover layer.

In addition, only limited transverse forces can be absorbed by embodiments having parallel rod-shaped Typha leaves. Without a cover layer, it is only possible to absorb transverse forces perpendicularly to the rod-shaped Typha leaves to the extent that the adhesive force is sufficient. While it is generally possible to sufficiently absorb transverse forces, higher transverse forces can be absorbed with a suitable cover layer. In this way, further improvement of the structural element is achieved. In addition, a cover layer improves the protection from lateral damage. For example, more strongly compressed panels made of Typha leaf mass, as they are known from prior art, can be used as the cover layer. These are isotropic, so that the above-described effects do not occur with a parallel orientation of the rod-shaped Typha leaves. However, many other materials are also conceivable.

Another option for improving the ability to absorb transverse forces is achieved if, in a first layer of the structural element, the rod-shaped Typha leaf particles are oriented in a first direction perpendicularly to the thickness of the structural element, and in at least one further layer they are oriented in a direction deviating from the first direction, perpendicularly to the thickness of the structural element. In a flat panel, for example, it is useful to arrange the rod-shaped Typha leaves longitudinally in a first layer, and transversely in a further layer, which is situated in the middle. This middle layer can then finally be followed by a third layer, in which the rod-shaped Typha leaves are disposed longitudinally.

To the extent that systems comprising multiple layers are known in DE 197 54 418 B4, a random arrangement of Typha leaf particles is provided in one of the layers. The advantages described above are not achieved this way.

Since the parallel arrangement of rod-shaped Typha leaf particles provides major advantages and extensive material savings, the additional manufacturing complexity for multiple layers is acceptable. Compared to a panel comprising one layer in which the rod-shaped Typha leaf particles are not arranged parallel, material and weight can be saved at the same load-bearing capacity and the same ability to absorb transverse loads.

The layers also do not have to be equally thick. In a load-bearing wall, for example, high forces must be absorbed in one direction. It is in this direction that most of the rod-shaped Typha leaves must be arranged. Only low transverse forces occur in a direction perpendicular thereto.

Based on FIG. 1, the invention will be briefly described in greater detail hereafter using one exemplary embodiment. FIG. 1 shows a highly schematic illustration of a structural element 1 designed as a flat panel. The flat panel 1 has a height 2 of approximately 180 cm and a width 3 of approximately 60 cm. The thickness 4 is approximately 10 cm. The rod-shaped Typha leaf particles 5 can be seen. In a real panel, the entire panel volume—apart from a potentially present cover layer—is filled with the rod-shaped Typha leaf particles 5. For the sake of clarity, only isolated ones are shown. The areas with hatching are intended to indicate that the rod-shaped Typha leaf particles 5 are surrounded by adhesive 6. The adhesive 6 is only a thin film and shown in an oversized manner in the FIGURE. With this adhesive 6, the rod-shaped Typha leaf particles 5 are bonded among each other. It is apparent that the rod-shaped Typha leaf particles 5 are disposed perpendicularly to the thickness 4. The rod-shaped Typha leaf particles 5 are disposed parallel to each other. They start and end in various areas of the panel 1. It is apparent that some of the rod-shaped Typha leaf particles 5 are severed as a result of the panel being cut to size, which is done during production. In the longitudinal direction, which is to say in the direction of the height 2, the panel 1 has a compression strength of approximately 0.5 N/mm. The heat conduction in the direction of the thickness 4 is approximately 0.040 W/mK.

The invention claimed is:

1. A structural element having a thickness and a planar extension, the structural element having heat-insulating properties and comprising longitudinally cut Typha leaves formed into rod-shaped Typha leaf particles, wherein the rod-shaped Typha leaf particles are oriented perpendicularly to the thickness of the structural element along an entire length of the structural element and are bonded together, wherein sponge tissue of the rod-shaped Typha leaf particles is substantially preserved in the structural element without substantial damage, and wherein the rod-shaped Typha leaf particles are oriented parallel to each other.

2. The structural element according to claim 1, wherein at least one direction of the planar extension is straight.

3. The structural element according to claim 1, wherein, during production, the rod-shaped Typha leaf particles are pressed against each other using a pressure of approximately 0.1 bar to approximately 1 bar in the direction of the thickness, depending on the degree of parallel orientation.

4. The structural element according to claim 1, wherein for bonding at least one of a Sorel bond or a cement bond is present, the weight ratio of adhesive to the rod-shaped Typha leaf particles being in the range from 0.5 to 1.5.

5. The structural element according to claim 1, wherein the length of the rod-shaped Typha leaf particles is selected as a function of at least one of the desired shape of the structural element, the orientation of the rod-shaped Typha leaf particles, or the planned use of the structural element.

6. The structural element according to claim 1, wherein rod-shaped Typha leaf particles cut to substantially the same length are predominantly present.

7. The structural element according to claim 1, wherein the structural element has a cover layer attached to at least one side of the structural element.

8. The structural element according to claim 1, wherein the rod-shaped Typha leaf particles are oriented in a first direction perpendicularly to the thickness of the structural element in a first layer of the structural element, and the rod-shaped Typha leaf particles are oriented in a direction deviating from the first direction perpendicularly to the thickness dimension of the structural element in at least one further layer.

9. The structural element according to claim 1, wherein the rod-shaped Typha leaf particles are bonded together by way of mineral bonding using no substantial non-mineral additives.

10. The structural element according to claim 1 in the form of a panel having a thickness and a length, the length extending along a longitudinal direction of the panel perpendicular to the thickness of panel, the panel having heat-insulating properties and comprising longitudinally cut Typha leaves formed into rod-shaped Typha leaf particles, wherein the rod-shaped Typha leaf particles are oriented in the longitudinal direction of the panel along the entire length of the panel, and the Typha leaf particles are bonded together, wherein no cover layer is required to stabilize the panel under a longitudinal load.

11. The panel of claim 10, wherein the panel without a cover layer has a compression strength of approximately 0.5 N/mm in the longitudinal direction.

* * * * *